No. 791,104. PATENTED MAY 30, 1905.
W. B. NEEL.
NUT LOCK WASHER.
APPLICATION FILED AUG. 12, 1903.
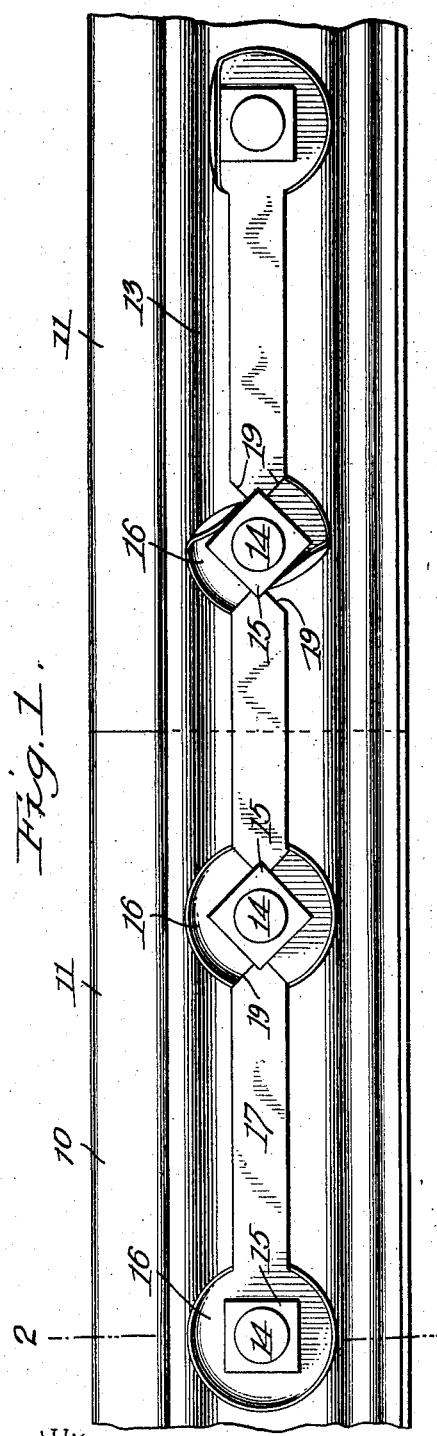
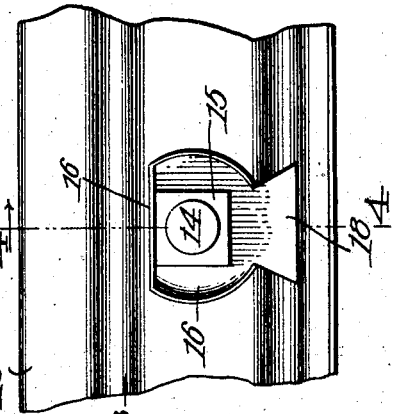
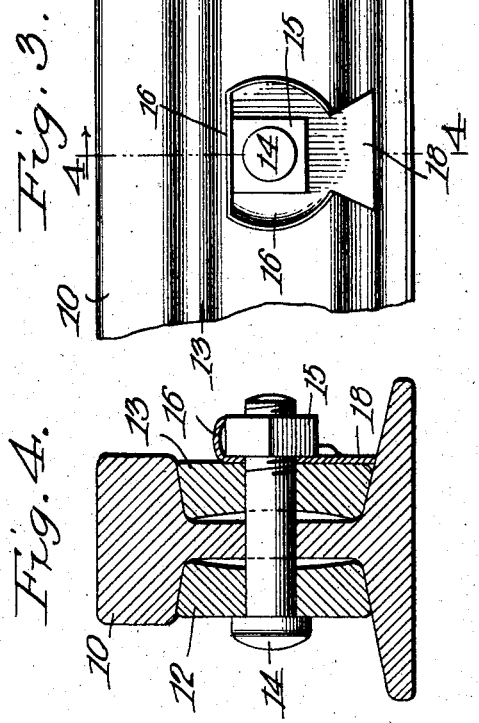
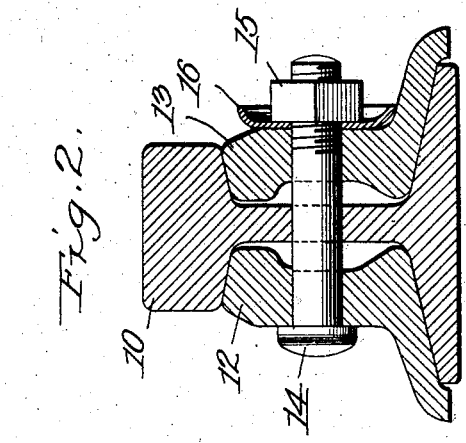
Witnesses
E. K. Stewart.
C. N. Woodward.
W. B. Neel, Inventor.
by C. A. Snow & Co.
Attorneys No. 791,104. Patented May 30, 1905.

UNITED STATES PATENT OFFICE.

WILLIAM B. NEEL, OF WILSONVILLE, KENTUCKY.

NUT-LOCK WASHER.

SPECIFICATION forming part of Letters Patent No. 791,104, dated May 30, 1905.

Application filed August 12, 1903. Serial No. 169,261.

*To all whom it may concern:*

Be it known that I, WILLIAM B. NEEL, a citizen of the United States, residing at Wilsonville, in the county of Spencer and State of Kentucky, have invented a new and useful Nut-Lock Washer, of which the following is a specification.

This invention relates to devices employed for locking nuts upon bolts, more particularly the bolts of railway-rail joints, and has for its object to simplify and improve devices of this character and produce a device which may be cheaply constructed, easily applied, and which will effectually hold the nut in whatever position it may be "set" and prevent its working loose, no matter how severe may be the jarring strains to which it will be subjected.

The invention consists in certain novel features of construction, as hereinafter shown and described, and specified in the claim.

In the drawings, in which corresponding parts are denoted by like designating characters, Figure 1 is a side elevation of a railway-rail joint with the improvement applied. Fig. 2 is a transverse section on the line 2 2 of Fig. 1. Fig. 3 is a detail view illustrating a modification in the construction. Fig. 4 is a transverse section on the line 4 4 of Fig. 3.

While I have shown the improved washer applied to a railway-rail joint, I do not wish to be limited in any manner to the use of the device to any specific structure or locality, but reserve the right to its use for all purposes and in connection with all structures to which it is adapted.

The structure selected to illustrate the application of the improved device consists of an ordinary railway-rail joint, 10 11 representing the rail ends; 12 13, the clamp-plates; 14, the clamp-bolts, having the nuts 15.

The improved device consists of a washer-plate 16, having a central aperture engaging the bolt between the nut and clamp-plate and extending beyond the periphery of the nut and with its margin "crimped" or turned outwardly, as shown in Fig. 2, so that it extends outwardly away from the outer face of the clamp-plate, leaving a recess or space between the washer and clamp plate, as shown.

Then when the nut is set up as tightly as required a properly-formed implement, such as a pair of pincers, will be inserted within the recess and the free edges of the washer-plates bent over into engagement with the nut, and thus effectually prevent its turning upon the washer-plate.

Two or more of the washer-plates may be connected by an integral lateral extension or bar 17, as in Fig. 1, in which instance said extension will serve as a common locking means for all of the washers so connected to hold them against rotation, or a lateral extension 18, as in Fig. 3, may be formed upon each washer-plate individually, in which instance said extension will engage the base-flange of the rail or other stationary portion of the member through which the bolt is passed. By this simple means the washer-plates may be firmly "locked" to the nut and also to the body being held by the bolt and all rotative movement of the nut upon the bolt effectually prevented.

The plates 16 may be provided with spaced radial clefts 19, if required, to facilitate the bending of their margins into engagement with the nuts.

The crimping of the margins of the washer-plates, whereby recesses are left between the adjacent faces of the washer and clamp plates, is an important feature of the invention, as by that means provision is made for the ready insertion of the bending implement and obviates the necessity for providing a specifically-formed implement for that purpose, as any implement which may be forced into the recess will accomplish the work. Thus the completion of the "locking" process may be quickly and readily accomplished with the implement which may be most convenient. This is an important feature of the invention and adds materially to its efficiency and operativeness.

Having thus described my invention, what I claim is—

The combination with a body, of a plurality of bolts extending therethrough, nuts threaded on said bolts, a flat longitudinal bar having terminal and intermediate openings formed therein for the reception of said bolts and having its opposite ends at said openings terminating in spherical enlargements, the continuous marginal edges of which are curved laterally beyond the general plane of the bar to form washers, said bar having its upper and lower edges at the intermediate openings extended laterally forming spaced projections, the marginal edges of which are curved both longitudinally and laterally, there being reversely-inclined incisions formed in the bar on each side of the intermediate openings and extended inwardly from the points of juncture of the longitudinally-curved marginal edges of the lateral projections with said bar to thereby permit the washers to be bent inwardly into engagement with the nuts on either side of the openings.

In testimony that I claim the foregoing as my own I have hereto affixed my signature in the presence of two witnesses.

WILLIAM B. NEEL.

Witnesses:
JAMES S. McMULLAN,
W. M. CARDWELL.